United States Patent [19]

Helm

[11] 3,957,570

[45] May 18, 1976

[54] MACHINERY FOR PATCHING ENVELOPES AND THE LIKE

[75] Inventor: Herbert W. Helm, Hollidaysburg, Pa.

[73] Assignee: F. L. Smithe Machine Company, Inc., Duncansville, Pa.

[22] Filed: July 20, 1973

[21] Appl. No.: 381,108

Related U.S. Application Data

[63] Continuation-in-part of Ser. No. 311,171, Dec. 4, 1972, abandoned, which is a continuation of Ser. No. 81,974, Oct. 19, 1970, abandoned.

[30] Foreign Application Priority Data

Oct. 13, 1971 Germany ............................ 2150908

[52] U.S. Cl. ................................ 156/519; 93/61 A; 156/521; 156/552; 156/568

[51] Int. Cl.² ...................... B32B 31/00; B31B 1/00

[58] Field of Search ........... 156/519, 521, 108, 514, 156/552, 566–568; 93/61 A, 63 R, 63 M, 35 MW; 53/389; 83/341, 343, 346

[56] References Cited

UNITED STATES PATENTS

| | | | |
|---|---|---|---|
| 3,322,600 | 5/1967 | Harrison et al. | 156/519 X |
| 3,431,830 | 3/1969 | Stovall | 83/343 |
| 3,502,536 | 3/1970 | Youngman et al. | 156/519 |
| 3,582,437 | 6/1971 | Lenk | 156/108 X |
| 3,654,038 | 4/1972 | Hottendorf | 156/521 |

*Primary Examiner*—William A. Powell
*Assistant Examiner*—M. G. Wityshyn
*Attorney, Agent, or Firm*—Nolte and Nolte

[57] ABSTRACT

Patches for envelope windows are cut, one per envelope, from a patch web supplied at a surface speed proportional to but lower than the speed of a travelling envelope web. The cut patches are transferred from the cut-off apparatus to the envelope web by a rotary vacuum system, at a surface speed which equals the speed of the latter web, or is accelerated to this latter speed. Steps and means are provided for insuring proper positions and motions of the cut-off patch, at points where the speed thereof changes.

5 Claims, 16 Drawing Figures

INVENTOR
HERBERT W. HELM
BY
Nolte & Nolte
ATTORNEYS

INVENTOR
HERBERT W. HELM
BY
Nolte & Nolte
ATTORNEYS

Fig.5.
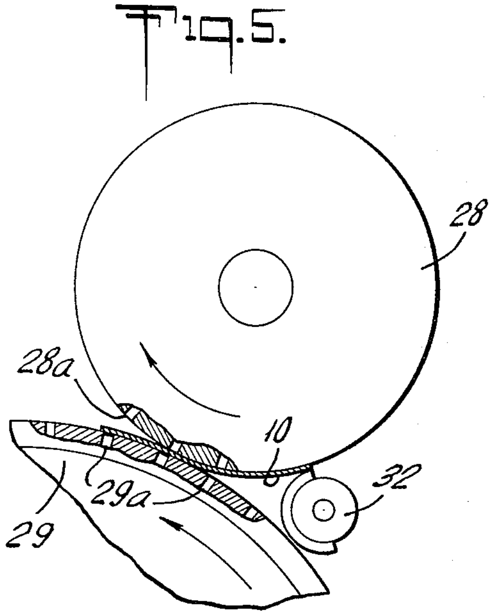
Fig.6.
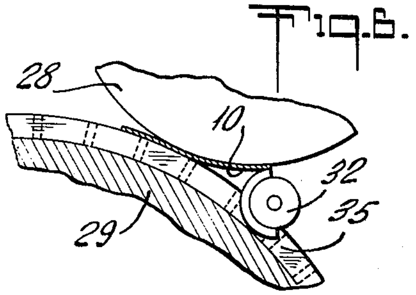
Fig.4b.
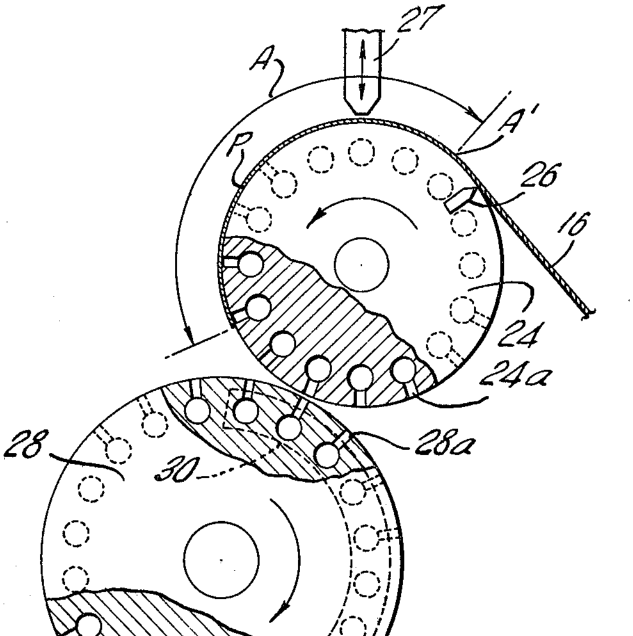
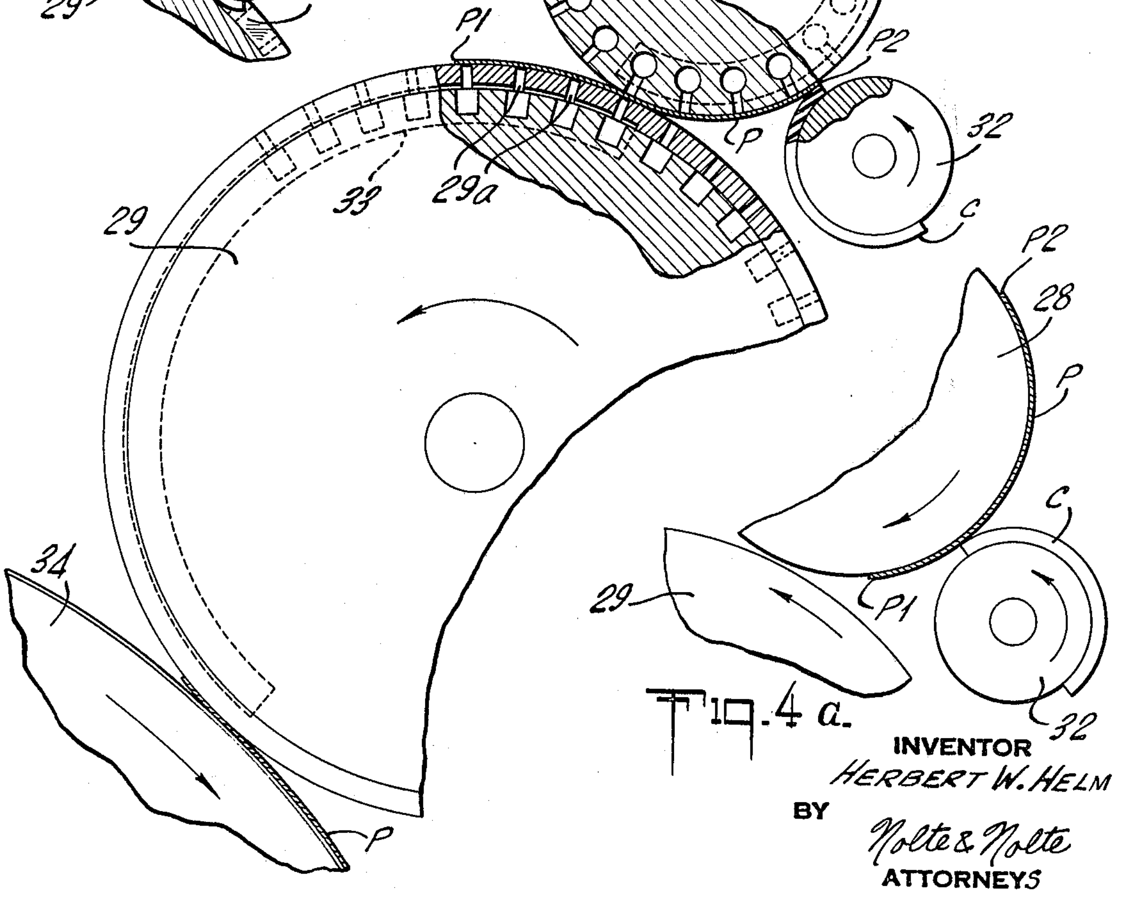
Fig.4 a.
INVENTOR
HERBERT W. HELM
BY
Nolte & Nolte
ATTORNEYS INVENTOR
HERBERT W. HELM
BY
Nolte & Nolte
ATTORNEYS INVENTOR
HERBERT W. HELM
BY
Nolte & Nolte
ATTORNEYS

MACHINERY FOR PATCHING ENVELOPES AND THE LIKE

This is a continuation-in-part of application Ser. No. 311,171, filed Dec. 4, 1972, as a continuation of Ser. No. 81,974, filed Oct. 19, 1970, both applications now abandoned.

BACKGROUND AND NATURE OF THE INVENTION

The invention relates to a method of and machinery for making window envelopes and the like, provided with window patches of variously regulated dimensions and produced at high speeds of production. In this field much difficulty has been encountered because of the relative smallness of the window patches in comparison with typical envelopes, the innumerable variations of relative dimensions, the necessity to transfer and apply the cut window patches at great and increasing speeds, and the further necessity not to lose the advantage of a nominal patch applying speed by time consuming operations for readjustment of the machinery, mainly in cases of variation of relative dimensions of patches and envelopes.

The invention is an improvement on U.S. Pat. No. 3,618,483 of the present assignee, and on earlier patents listed therein.

The method of the invention is distinguished by providing a novel combination of modes and relative velocities of motion for the surfaces of a patch web, a cut-off patch, a patch transfer system, and an envelope blank. Details of these modes and velocities of motion will be described in connection with the operation of machines in accordance with the invention.

The invention provides two types of new apparatus, both for performance of the new method. The first new apparatus is distinguished by providing means whereby the newly cut-off patch first slips on a patch transfer cylinder or roll which rotates at envelope surface speed, while the patch is accelerated to the speed of the envelope, and whereby, mainly in a subsequent phase of its transfer, the cut-off patch is held against a transfer surface by a release segment. In certain forms of the first apparatus according to the invention, the release segment is located in a position close to the point of meeting between a patch transfer roll and the web transfer roll, for handling smaller patches. In another embodiment, the release segment is located adjacent the cutter roll and co-acts therewith.

The second and preferred new apparatus dispenses with the release segment and uses a novel combination of patch cutting means, transfer means and patch applying means.

This new combination is characterized by its ability to run a transfer cylinder at the exact surface speed of the envelop web, and to allow an edge of the patch to slide on this cylinder until the patch has been cut off, when the patch immediately assumes the surface speed of the transfer cylinder, equal to the envelope speed.

DRAWINGS

The new apparatus will now be further described by reference to specific embodiments thereof, in which FIG. 1 is a schematic view, in side elevation, of a first embodiment of the first apparatus, according to the invention;

Figure 1:
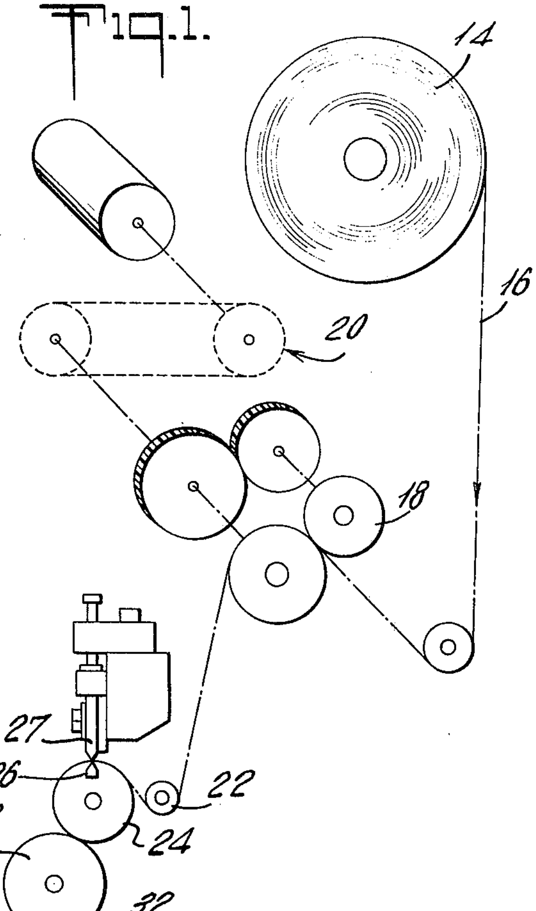
Figure 1:
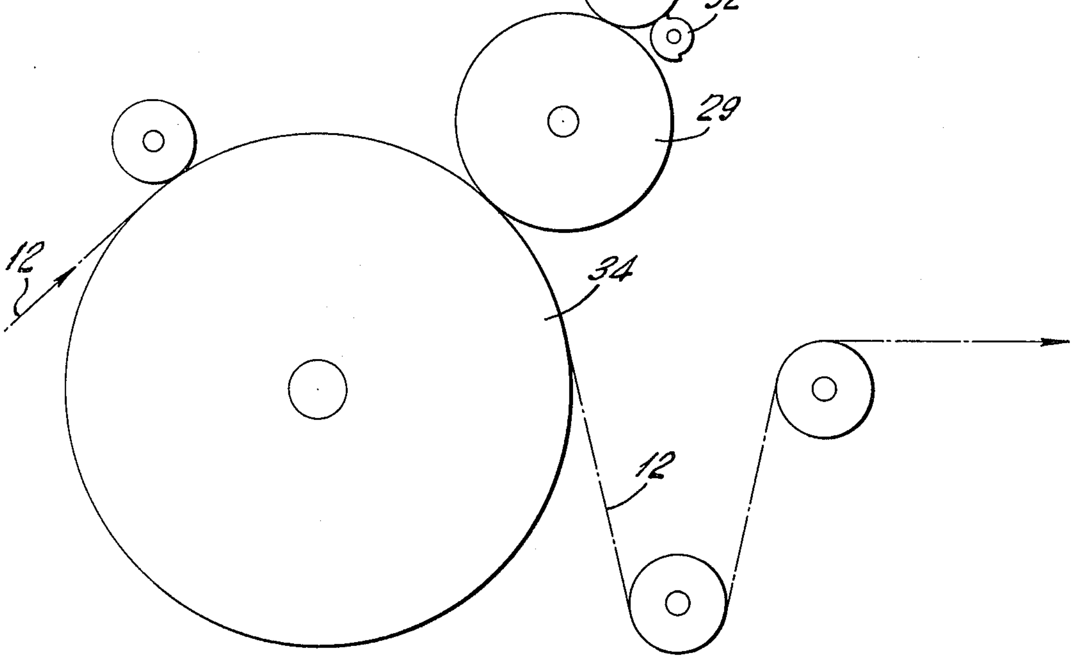
Figure 11:
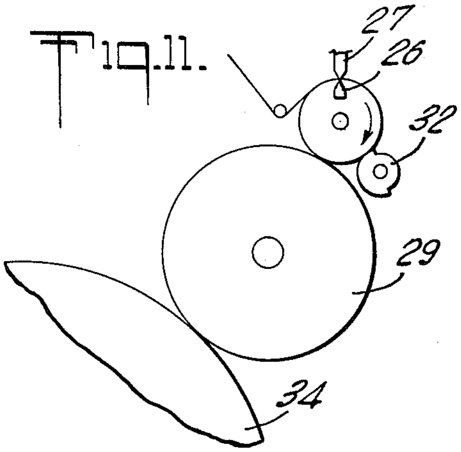
Figure 12:
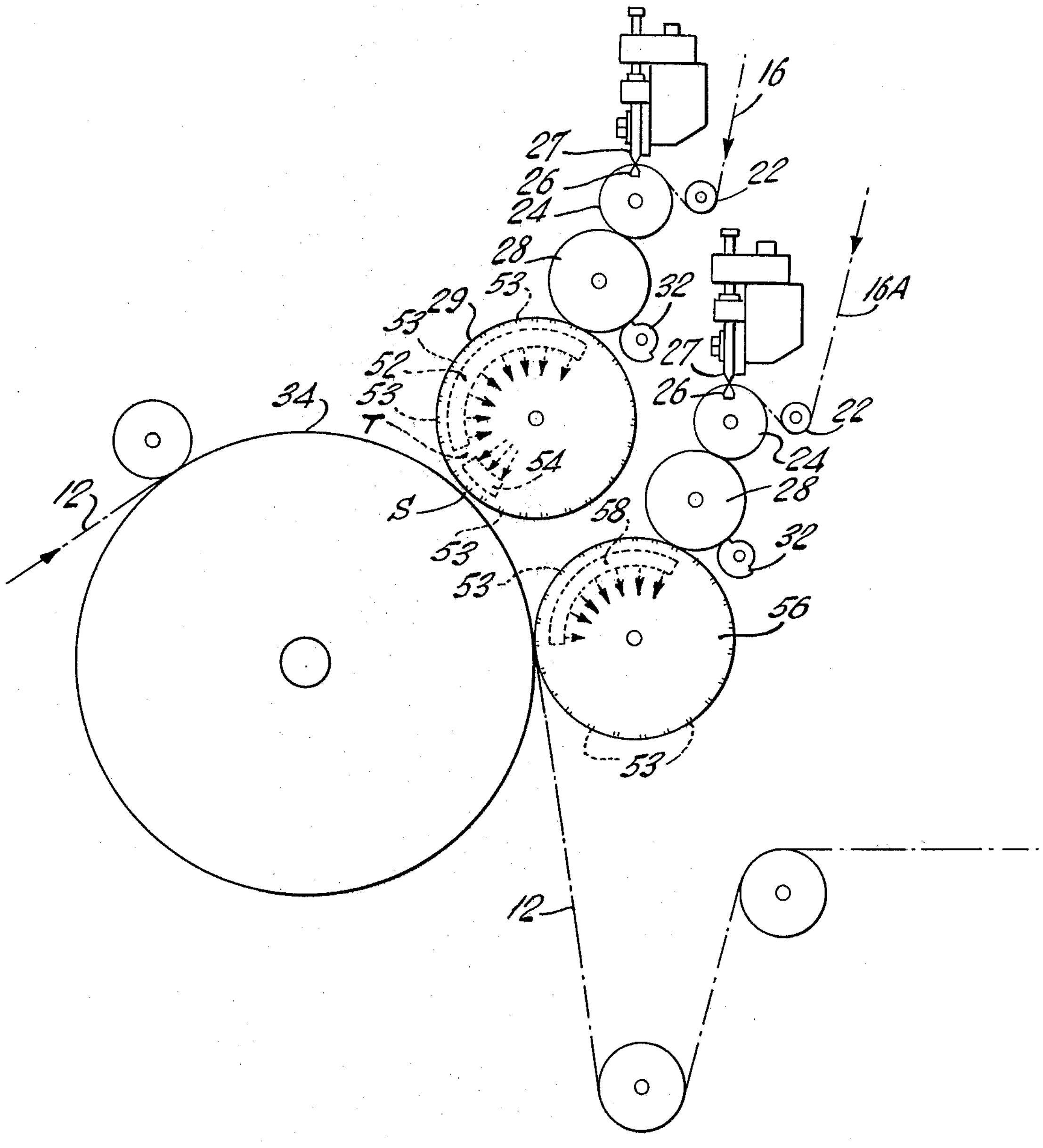

FIG. *4a* and *4b* are fragmentary sectional view of an embodiment similar to FIG. 1 but shown, on a larger scale, with two positions of the release segment;

FIG. 5 is a side elevational and partly sectional view of a further slight modification of FIG. 1, in which a smaller release segment is used;

FIG. 6 is a view similar to FIG. 5 in which a recess is provided in the transfer cylinder accommodating part of the release segment for a very small patch;

FIGS. 7–10 are diagrammatic views showing a series of steps carried out in accordance with a first way of using the new method;

FIG. 11 is a fragmentary view of the patch cutter and patch transfer arrangement of FIG. 1, slightly modified;

FIG. 12 is a diagramatic view of another embodiment of the present invention in which two patches are applied to the envelope web.

Figure 13:
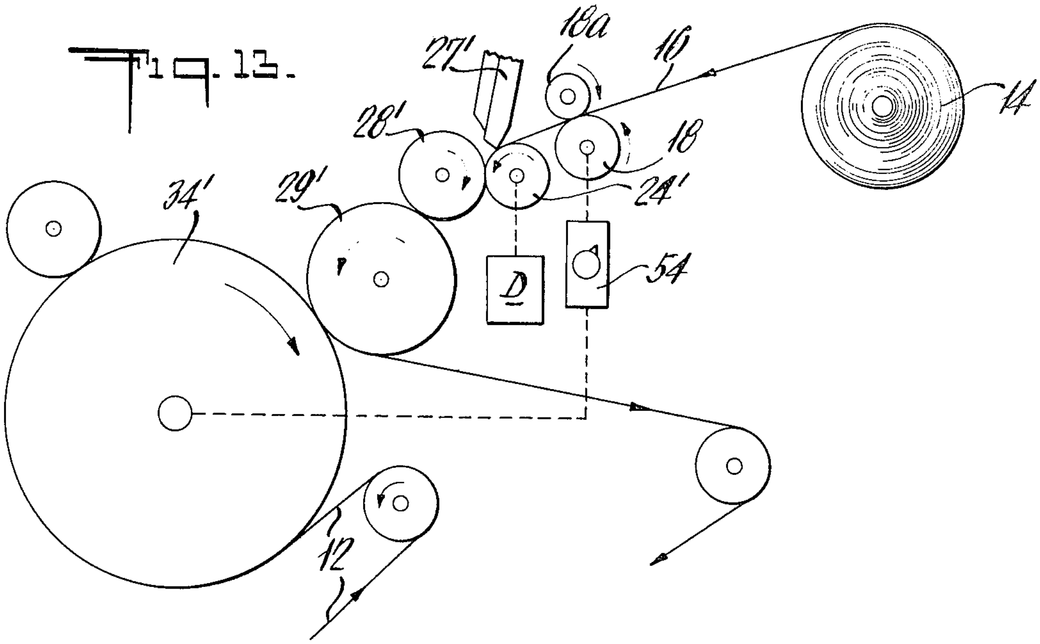
Figure 14:
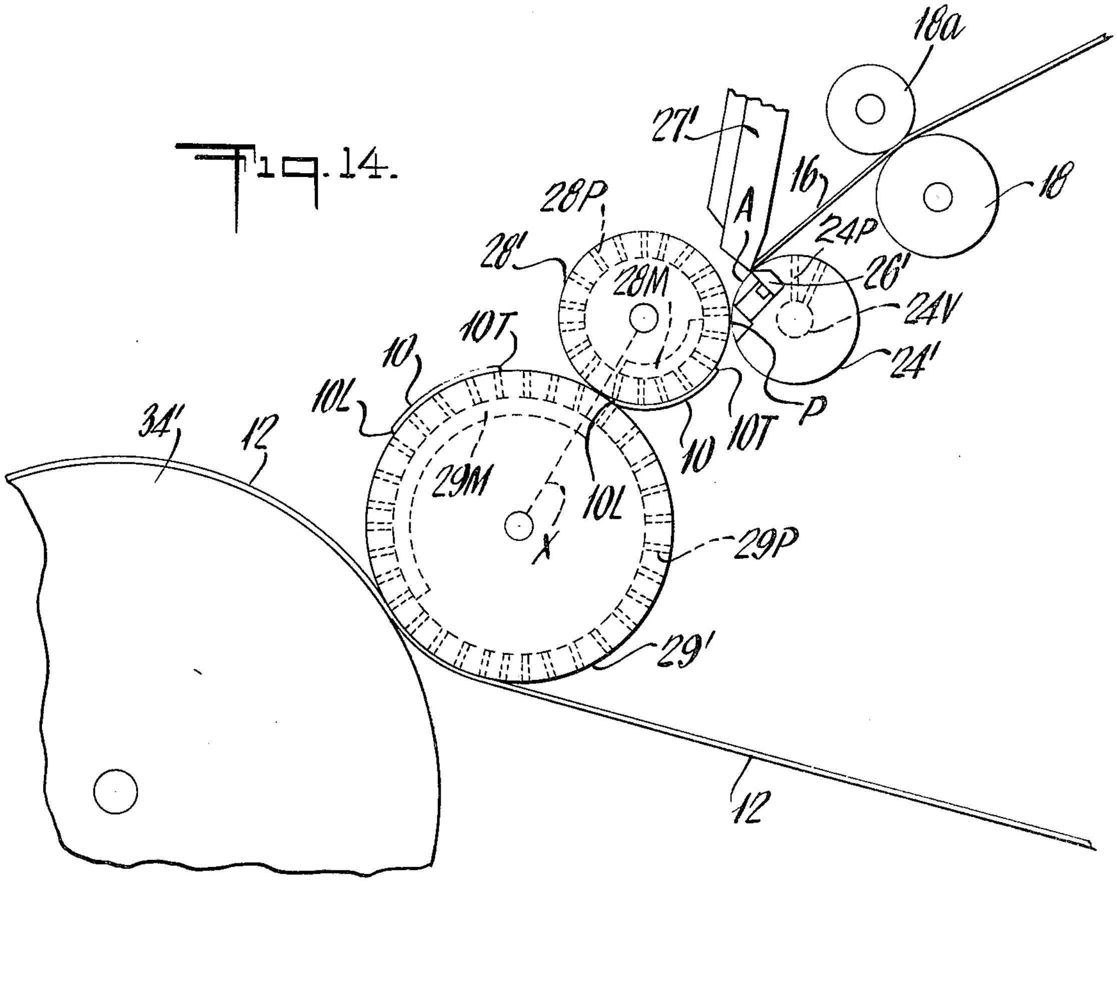
Figure 15:
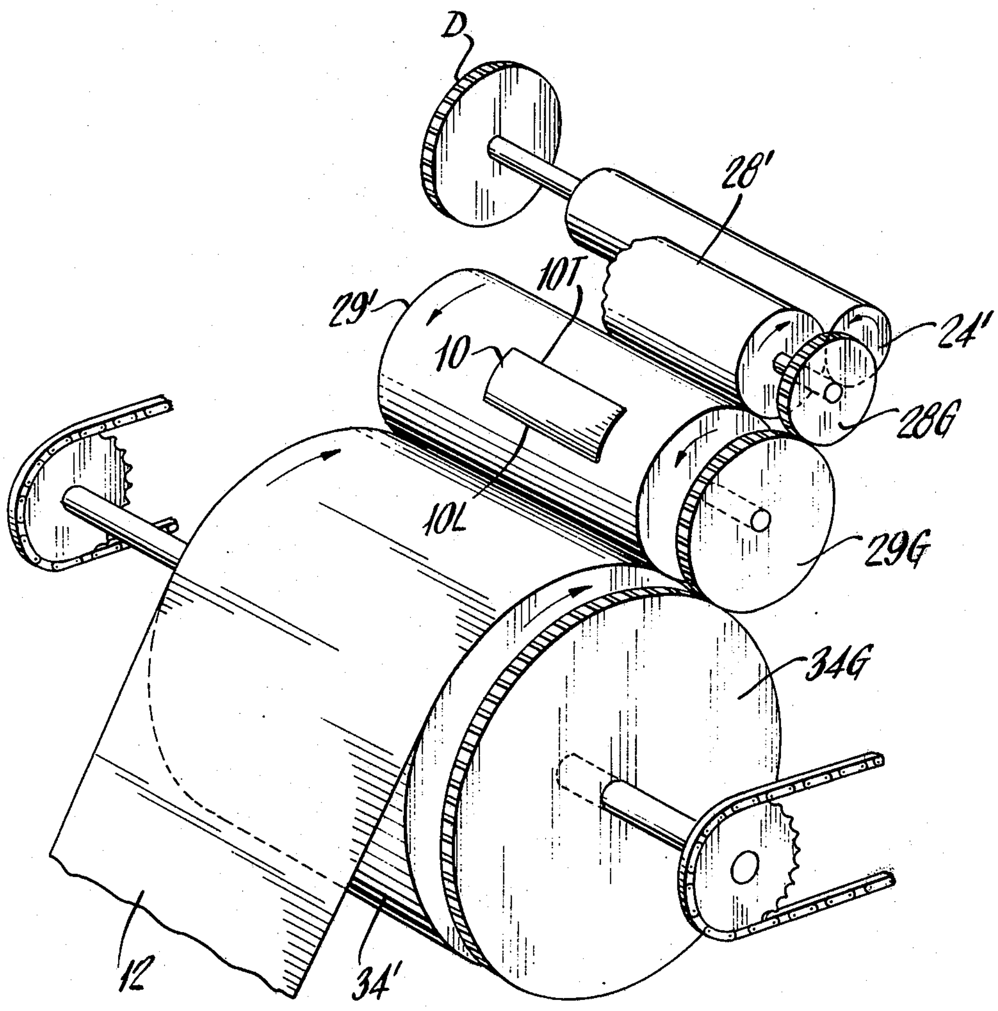

FIG. 13 is a schematic view, in side elevation, of the second and preferred apparatus of the invention;

FIG. 14 is a similar but fragmentary view, partly in section and on a larger scale; and FIG. 15 is a perspective view of the apparatus of FIGS. 13 and 14.

DETAILED DESCRIPTION

Figure 2:
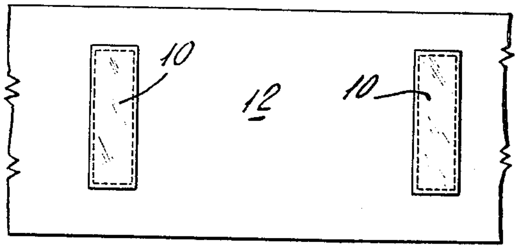
FIG. 2 is a fragmentary top plan view of the envelope web with patches applied thereto.
Figure 3:
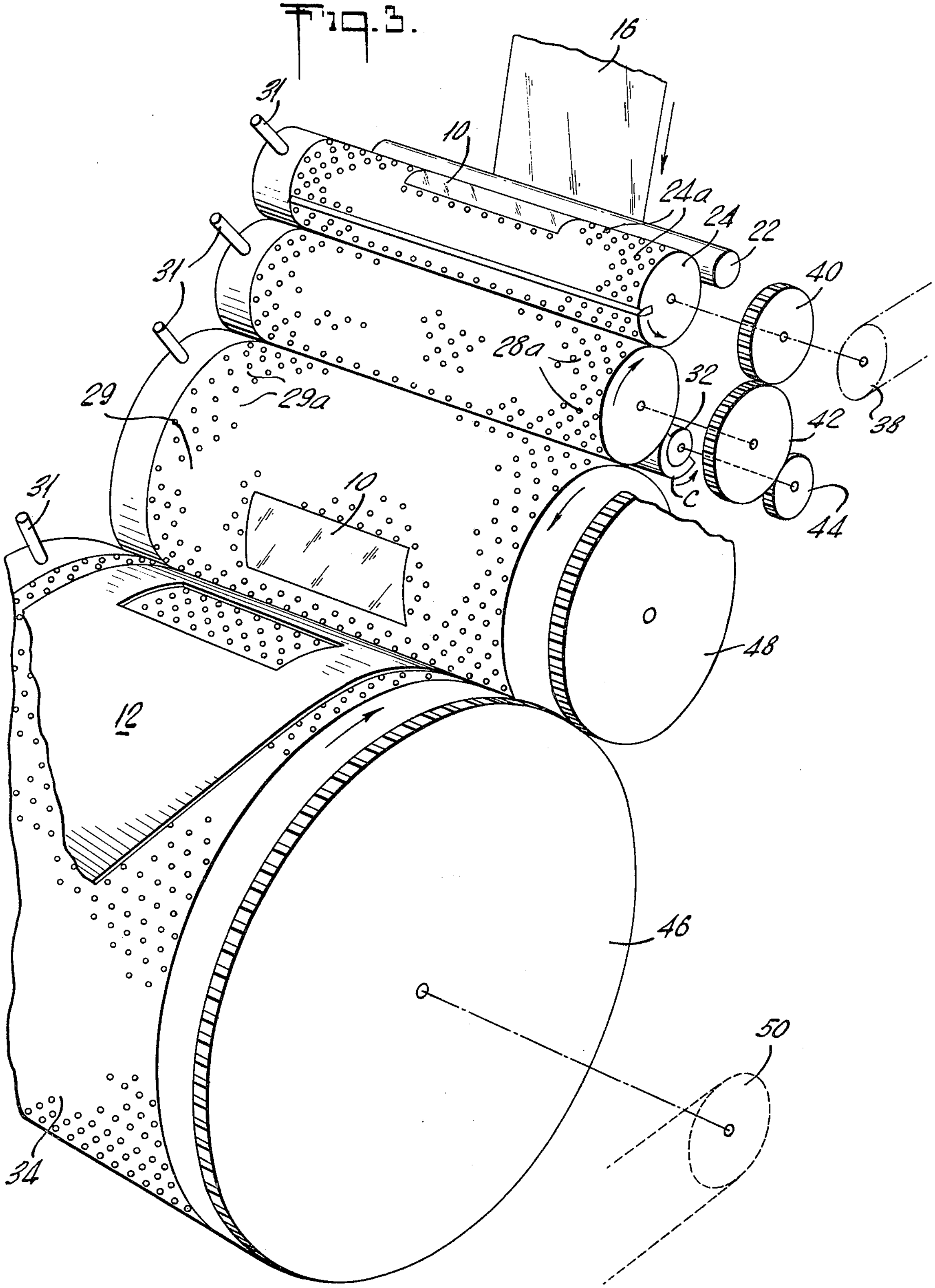
FIG. 3 is a perspective view of the patch cutter and patch transfer arrangement to the web assembly.

Referring to the drawings, and particularly to FIGS. 1–3, **4*a*, 4*b* and 7–10, the first form of the new apparatus comprises a patch cutter and transfer and release means for applying the cut patch 10 to a moving pregummed web 12. As seen in FIGS. 1, 3 and 4*a*, a supply roll 14 delivers the coiled transparent patch strip 16 to the pull rolls 18. A variable speed drive 20 is utilized in order to selectively determine the desired length of the patch. The drive 20 forms no part of the present invention, but is merely set forth to indicate the path of movement of the patch strip 16. The latter passes around roll 22 and is drawn about the rotating cutter roll 24 having vacuum holes 24*a* and provided with a rotating cutter 26. A stationary cutter 27 is mounted adjacent the cutter roll 24 in co-acting relationship with the rotating cutter 26 in order to make the proper cut of the patch. As seen in FIG. 4*b*, the patch P′ is to be cut to the length A, and since the patch strip 16 is moving at a slower speed than the cutter roll 24 the cutter 26 will catch up to the slower moving strip 16 and make the cut precisely at the end A′ of the patch length A when the end A′ arrives adjacent to stationary cutter 27.**

The cut patch P′ is held on cutter roll 24 until it is picked up by the vacuum ports **28*a* of the transfer roll 28. As clearly seen in FIG. 4*b*, the transfer roll 28 is provided with a vacuum manifold 30 which is connected through pipes 31 to a vacuum source (not shown). Thus, only those vacuum ports 28*a* which are connected to the manifold 30** will draw a vacuum on the cut patch P′.

Mounted adjacent the transfer roll 28, according to the first structural embodiment of the invention, is a release segment 32 which rotates in a direction opposite to the rotation of the transfer roll 28. The release segment is preferably covered with a urethane polymer or rubber C. Therefore, the patch P′ is securely held by the release segment 32 and positively released at the moment of segment release.

A second transfer roll 29 rotates in a direction counter to the direction of rotation of the transfer roll 28 and is mounted adjacent the latter. The roll 29 rotates at the web surface speed and is provided with a plurality of vacuum ports 29*a* and a manifold 33 connected through pipes 31 to a vacuum source, not shown.

It should be noted that prior to the segment release the patch P' slips on the transfer roll 29 which rotates at the same speed as the web transfer cylinder 34. FIG. 4*a* shows the point of initial engagement of the release segment 32 with the point of release of engagement of the release segment 32 with the patch P', while FIG. 4*b* shows the point of release of engagement of the release segment 32 with the patch *P'*.

FIGS. 7–10 show the sequence of steps involved in the cutting of an envelope patch and transferring the same to the transfer roll 29 which is moving at the same speed as the moving web on a web transfer cylinder 34. It should be noted that in step 2 of FIG. 8 the transfer roll 28 is rotated 90° while the release segment 32 is rotated 180°. In step 3 of FIG. 9 the transfer roll 28 has rotated 180° while the release segment 32 is rotated back to its original position. In step 4 of FIG. 10 the transfer roll 28 has rotated 270° while the release segment 32 has again rotated 180°.

It should also be noted that in this embodiment the rolls 24 and 28 rotate at the same speed, which is different from the speed of the rolls 29 and 34.

Figure 7:
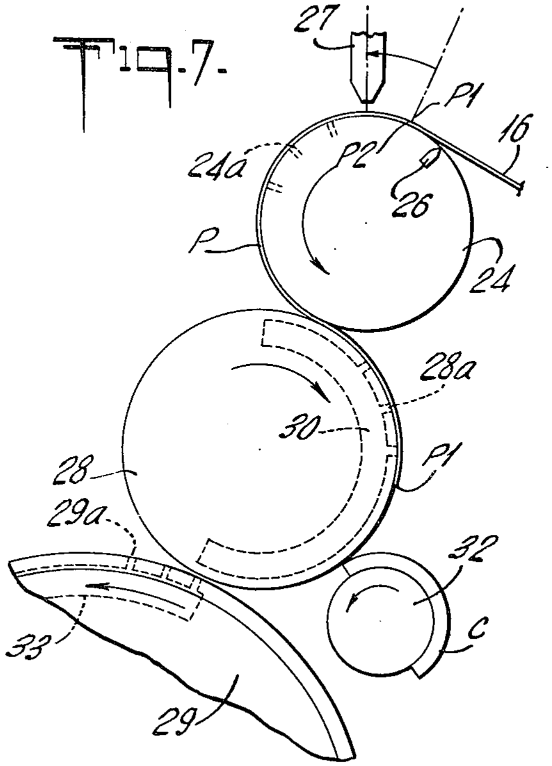
Figure 8:
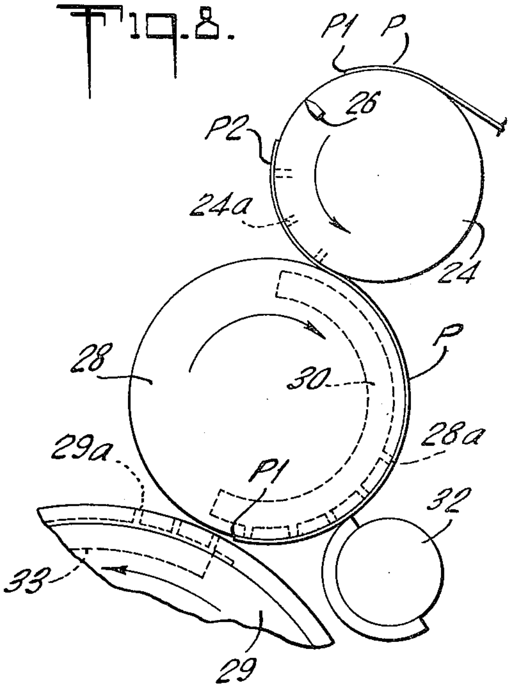
Figure 9:
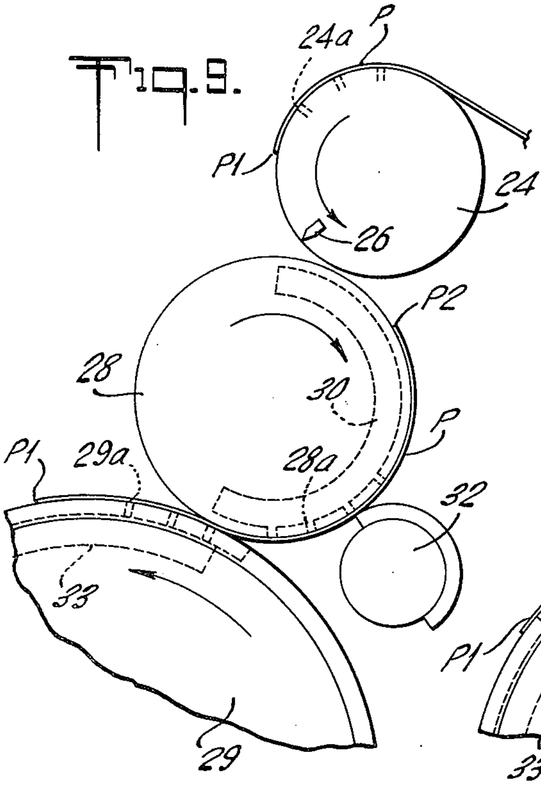
Figure 10:
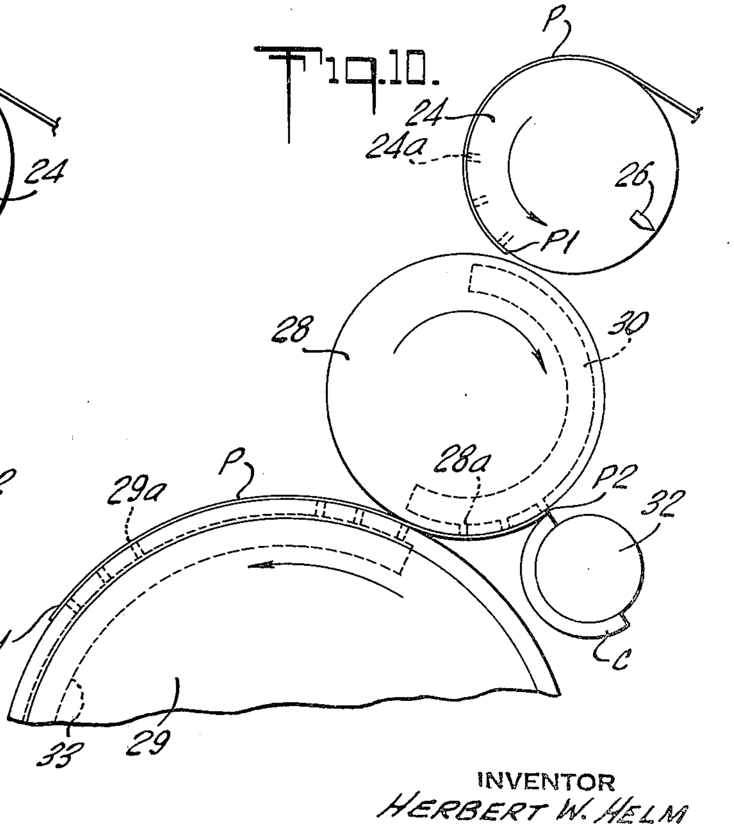

FIG. 7 is step 1 of the sequence in which the patch P is pulled over rolls 24 and 28 rotating at the same surface speed. The vacuum ports 24*a* of roll 24 and the vacuum ports 28*a* connected to vacuum manifold 30 of the roll 28 hold the patch P on the respective rolls. The trailing edge P2 of the patch P is cut as described hereinbefore by the co-action of fixed cutter 27 and rotating cutter 26. As will be noted, the leading edge of the patch P is designated as P1. It should also be noted that the release segment 32 rotates at the same surface speed as rolls 24 and 28. As seen in step 2, shown in FIG. 8, the release segment 32 releases the patch P just behind the leading edge P1 thereof. Step 3, shown in FIG. 9, discloses the release segment rotated to a position where it again engages the patch P. In this case, the leading edge P1 is held on the roll 29 by vacuum holes 29*a*, but slips thereon due to the fact that the surface speed of the roll 29 is faster than the surface speeds of adjacent roll 28 and segment 32 and the vacuum pull in roll 29 has not yet begun to take hold. In the position between FIG. 8 and FIG. 9, wherein the release segment 32 is not holding the patch, slippage is caused by the vacuum in roll 28 acting on the patch P being greater than the vacuum in roll 29 acting on the same patch, thus holding the trailing edge P2 and a portion of the patch P forward thereof in engagement with the rotating roll 28. Immediately after the position of the mechanism shown in FIG. 9, there are a greater number of operative vacuum ports 29*a* of roll 29 than the operative vacuum ports 28*a* roll 28. However, the patch P continues to rotate with the roll 28 while still slipping on roll 29, until the position shown in FIG. 10. This condition exists because the patch is held against roll 28 by the release segment 32, which for this purpose advantageously is covered with a resilient material having a high coefficient of friction. It will be seen in step 4, shown in FIG. 10, that the release segment 32 has rotated to a position where it is released from the trailing edge P2 of the patch P. At that time, the roll 29 has much more vacuum applied to the patch P than the roll 28, and therefore the patch P stops slipping on roll 29 and is positively held thereby wherein roll 28 speeds up the movement of the patch P to the surface speed of roll 29, being the same surface speed as the speed of the web on the web transfer cylinder 34.

As seen in FIG. 3, a drive 38 rotates the gears 40, 42 and 44 so that the rolls 24, 28 and release segment 32 rotate at the same surface speed, which is slower than the surface speed of the rolls 29 and 34, having gears 46 and 48 operated by a drive 50.

FIG. 5 illustrates a construction in which a smaller release segment 32 is utilized and is located closer to the meeting point of the transfer roll 28 and the web transfer roll 29 for handling a small patch, the surface speed of release segment 32 being the same as roll 28. FIG. 6 shows a similar arrangement as illustrated in FIG. 5, but having a recess 35 in the roll 29 for accommodating a part of a still smaller segment 32 in order for the release segment 32 to handle an envelope patch which is even smaller than patch shown in FIG. 5. Likewise, in this embodiment, the surface speed of release segment 32 is the same as the surface speed of roll 28.

FIG. 11 shows an alternate embodiment of the present invention in which the release segment 32 operates in conjunction with the cutter roll 24, thereby eliminating the need for roll 28.

FIG. 12 shows another embodiment of the present invention in which two envelope patches may be applied to the moving pre-gummed web 12. In this embodiment, a patch strip 16, as shown and described hereinbefore, is cut into patches and delivered to second transfer roll 29. It will be noted that in this embodiment the transfer roll 29 is spaced a small distance S from the web transfer cylinder 34 in order to avoid the offsetting of adhesive from the web 12 to the cylinder 29. Therefore, in order to transfer the cut patches from the second transfer cylinder 29 to the web transfer cylinder 34 a vacuum manifold 52 is shown which draws a vacuum on the patches through openings 53 and holds the cut patches P to the periphery of cylinder 29 until each of the patches on the rotating cylinder periphery pass the break point T, and the pressure manifold 52 is then connected to the openings 53 in the periphery of the cylinder 29. When this occurs, the patches P are blown off the cylinder 29 by positive air pressure and on to the web 12.

The second group of patches are cut from the second patch strip 16A which are delivered to auxiliary transfer cylinder roll 56. The latter is provided with a vacuum manifold 58 that is similar to vacuum manifold 33 shown in FIG. 4*b*. In this manner a second patch is inserted at the appropriate location on travelling web 12 in the manner shown in FIG. 4*b*.

Referring now to FIGS. 13–15, according to this embodiment, stationary cutter knife plate 27' is mounted opposite rotating cutter roll 24' which has movable cutter knife plate 26', and plate 27' is advantageously so disposed, adjacent the surface of the next following element (patch transfer roll 28') that the minimum length between the leading and trailing edges 10L, 10T of each individual cutoff patch 10 is longer than the distance from A at the patch cutting area, defined by the cutting edges of knives 26' and 27', and the adjacent point P which lies on the plane common to the axes of the cutter and transfer rolls 24' and 28'.

Cutter roll 24' is driven by a drive D at such surface speed as to provide one cutter roll rotation per envelope, this speed being faster than the travelling speed of patch web 16, whereas the surface speed of cutter roll 24′ is in the embodiment shown, slower than the surface speed of transfer roll 28′, which has a surface speed equal to the travelling speed of envelope web 12. Transfer roll 28′ transfers the cut patch to application roll 29′ which rotates in a direction counter to the direction of rotation of rolls 28′ and envelope web transfer roll 34′. These rolls 28′, 29′, 34′ as shown have progressive diameters but they are controlled by gear drives 28G, 29G and 34G (FIG. 15) to rotate at the same surface speed.

Rolls 24′, 28′ and 29′ are internally provided with vacuum ports, shown for example at 24P, 28P and 29P together with vacuum manifolds, which are shown at 28M and 29M for rolls 28′ and 29′; whereas the vacuum in the cutter roll 24′ is provided along the shaft as at 24V. The vacuum system serves to hold the web and patch materials to the proper roll surfaces, to such extent as the vacuum ports apply vacuum, through the vacuum manifolds, to said materials. In this respect, it will be noted that the beginning of manifold 28M is located adjacent the point of meeting between rolls 24′,28′, where the leading edge of patch 10 is firmly engaged by roll 28′. Similarly, the end of manifold 28M is located adjacent the point on that roll opposite the center of the next following roll, as shown by line X. The beginning and end of the vacuum manifold 29M of roll 29′ are correspondingly located, so that leading and trailing edges 10L, 10T of a patch 10 are simultaneously released by transfer cylinder 28′ as they are picked up by transfer cylinder 29′. These edges are released by the latter cylinder via vacuum cut-off as they are picked up by pre-gummed envelope web 12 which in this instance is tensioned around application roll 29′ for sure adhesion of the patch to the web before take-off.

According to FIGS. 13–14, the patch material web 16 is fed by feed rolls 18, 18*a*, from supply roll 14 to cutter roll 24′, at a speed proportional to the travelling speed of envelope web 12, the travelling speed of the patch web being adjustably set by P.I.V. drive 54 such as is described in detail in Kents Mechanical Engineering Handbook, 11th Edition Section 24, pp. 72, et seq.; the input and output shafts thereof being interconnected to the envelope web transfer cylinder 34′ and feed roll 18, as for instance described in U.S. Pat. No. 3,618,483.

Initially, a leading edge 10L of the patch is formed by the edges of knives 26′,27′, while the trailing edge 10T of the preceding patch 10 is carried off at a faster speed by transfer cylinder 28′. Meanwhile, the leading edge portion 10L of the new patch supply slips on the surface of the cut-off cylinder, travelling toward transfer area P at a faster surface speed than web 16. This is advantageously done with the aid of local vacuum ports 24P and manifold means 24V, in roll 24′, adjacent cutter 26′. This localized vacuum system 24V releases the leading edge portion of patch web 16 adjacent the point opposite the center of transfer roll 28′, where this patch portion then is picked up by that roll, at the higher, envelope web speed.

Thus, the apparatus of FIGS. 13–15 operates as follows: the driven pull rolls 18,18*a* are set to run at a preselected speed to draw the patch material from the supply roll 14. A length of window patch material is thus fed onto the cutter roll 24′ which will sever the patch from the web. The roll 24′ running faster in surface speed than the pull rolls 18,18*a* has vacuum ports 24P to grasp the material while it is being cut and present it to the transfer roll 28′. Roll 28′ having a progressive vacuum system and running at the same speed as the envelope paper web 12 serves to transfer the cut patch to the application roll 29′ which is also running at paper web speed. A skidding action takes place between the leading portion of the window patch material and the cutter roll 24′ and the transfer roll 28′ until the patch is severed. At this moment the patch immediately assumes paper web speed.

A unique feature of this mechanism is its ability to run the transfer roll 28′ and the application roll 29′ at paper web speed using an independent drive, gears 28G, 29G and 34G. Drive D drives the cutter shaft CS at one revolution per envelope cycle. The speed adjustment to the P.I.V. drive 54 determines the patch length or flow over the progressive vacuum rolls. No change parts are necessary for a patch placement change on the web or for web cut-off for the patch length.

Another feature is the placement of the cut patch 10 onto the application roll 29′ around which the pre-gummed envelope paper web is tensioned to squeeze the patch for good adhesion and subsequent pick-up. The vacuum in the application roll 29′ is turned off at the point of contact with the paper web.

In prior art machines, the patch is applied to the paper with a patch carrier. In such machines the patch applier runs at a constant speed and is timed to the individual blank to be patched. The distance from the leading edge of one blank to the leading edge of the preceeding and proceeding blanks is always the same - no matter what length envelope is being run. The spacing of envelope blanks is not adjustable except by changing the diameters of all cylinders. In a web machine, however, this distance from one window to the next can vary within the web according to envelope size (cut-off length). Therefore, an application roll such as disclosed herein running at web speed is advantageous with the patch length cycle controlled by the patch material cut-off roll 24′. This cylinder is driven independently from the transfer and application cylinders as stated previously.

Thus, the modification of the invention shown in FIGS. 13–15 provides a progressive vacuum in the cut-off knife shaft and transfer roll bringing the patch from its surface speed to the envelope web speed of the transfer, application and envelope feed rolls the latter three being driven by a drive independent of the patch cutter roll drive which makes one revolution per envelope cycle. The patch draw rolls feeding the patch material to the cutter roll are adjustable in surface speed to determine the length of the patch which is held on the surface of the application cylinder by vacuum and transferred to a pre-gummed paper web which is wrapped and tensioned around the application cylinder.

What is claimed is:

1. A patch cutter and transfer device for cutting patches from patch web material and transferring the patches to moving envelope webs within which and from one to the other the areas to be patched may vary in size and in spacing to thereby vary the length of patch required to be applied thereto and to vary the per envelope cycle thereof, comprising, a. means for moving an envelope web at a predetermined surface speed;

b. transfer and application cylinder means;

i. Separate means, independent of the next mentioned driving means, for driving said transfer and application cylinder means at the surface speed of the envelope web;

c. a cut-off cylinder;

i. separate means independent of said means for driving said transfer and application cylinder means for driving said cut-off cylinder at a surface speed related to the per envelope cycle of the envelope web being moved;

ii. said cut-off cylinder having at least one cutting knife at the exterior surface thereof;

d. a stationary cutter, operable with said cutting knife to cut patches from the patch web material and disposed adjacent a point of meeting of the transfer and application cylinder means with said cut-off cylinder a distance smaller than the patch to be cut;

e. means associated with said cut-off cylinder and said transfer and application cylinder means for holding each of the cut patches thereto and for ultimately releasing the patch for applying it to the envelope web;

f. means for feeding patch web material to said cut-off cylinder between said cutting knife and said stationery cutter.

i. separate variable drive means, independent of said means for driving said cut-off cylinder, for driving said feeding means to deliver the patch web material to said cut-off cylinder at surface speeds slower than and proportional to the surface speed of the envelope web being moved and slower than the surface speed of said cut-off cylinder, whereby the leading portion of the patch web material prior to cut-off skids upon the surfaces of said cut-off cylinder and said transfer and application cylinder means;

the arrangement being such that said separate means for driving said transfer and application means at the surface speed of the envelope web, and said separate means for driving said cut-off cylinder at a surface speed related to the per-envelope cycle of the envelope web being fed, and said separate variable drive means for driving said feeding means to deliver the patch web material constitute the sole means for varying the length of the patches transferred to the envelope web and for varying the timed application of the patches to the envelope web;

whereby the varying of patch length and the timed application thereof to an envelope web is accomplished without changing the diameters of said transfer and application cylinder means or said cut-off cylinder and without adjusting or changing said means for moving an envelope web or said means for driving said transfer and application cylinder means.

2. A patch cutter and transfer device as claimed in claim 1 wherein said transfer and application cylinder means comprises a separate transfer cylinder positioned adjacent said cut-off cylinder and a separate application cylinder positioned between said transfer cylinder and said means for moving an envelope web, said last mentioned means for moving an envelope web, and said means for driving said transfer and application means comprising common driving means.

3. A patch cutter and transfer device as claimed in claim 2 wherein said means for moving an envelope web comprises an envelope web transfer cylinder and said common driving means comprising gear driving means for rotating said transfer cylinder, said application cylinder and said envelope web transfer cylinder at the same surface speed.

4. A patch cutter and transfer device as claimed in claim 2, wherein said means associated with said cut-off cylinder and said transfer and application cylinder means comprises a progressive vacuum system, said cut-off cylinder including local suction means for holding only the leading portion of the moving patch web material on said cut-off cylinder as the patch web material is fed to said cut-off cylinder and just before the patch web material is cut and for conveying the leading portion to said transfer and application cylinder means and for releasing the cut patch thereto.

5. A patch cutter and transfer device as claimed in claim 2 including means for tensioning the envelope web about said transfer cylinder means prior to take-off therefrom.

* * * * *